April 9, 1957 — E. T. HOWES — 2,788,513
CABLE
Filed June 14, 1954 — 2 Sheets-Sheet 1

EDGAR T. HOWES,
INVENTOR.

BY
ATTORNEY.

April 9, 1957 E. T. HOWES 2,788,513
CABLE
Filed June 14, 1954 2 Sheets-Sheet 2
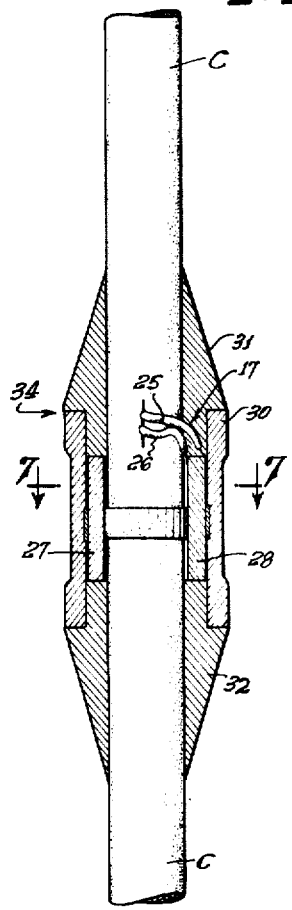
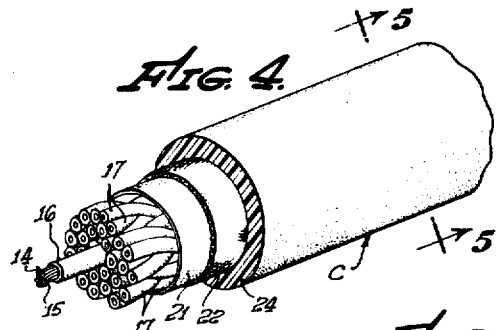
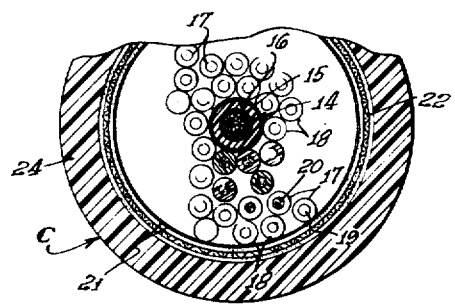
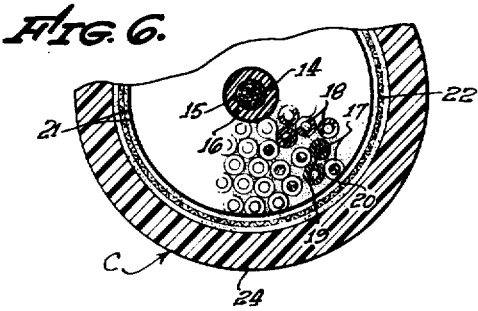
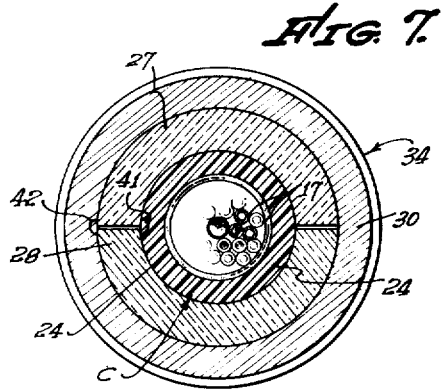
EDGAR T. HOWES,
INVENTOR.

United States Patent Office 2,788,513
Patented Apr. 9, 1957

---

2,788,513

CABLE

Edgar T. Howes, Pasadena, Calif., assignor to United Geophysical Corporation, Pasadena, Calif., a corporation of California Application June 14, 1954, Serial No. 436,463

10 Claims. (Cl. 340—17)

This invention relates to seismic prospecting and is particularly concerned with an improvement in the structure of cables that are used in vertical velocity profiling to transmit data from a plurality of geophones to recording equipment.

In seismic surveys carried out in order to locate deposits of oil, two methods of surveying are commonly employed, both employing the reflection of seismic waves from the different strata. One common method is known as "correlation shooting," and the other common method is known as "continuous profiling." In either reflection type of survey, seismic waves are usually generated by detonating an explosive charge at a seismic wave source adjacent the surface of the earth, usually below the weathered layer. The seismic wave, so generated, travels downwardly through successive subterranean strata, and a small amount of the energy in the seismic waves is reflected upwardly by each successive discontinuity in the earth's structure. Reflected waves returning to the surface of the earth from the various strata are detected by geophones located at various seismic wave receiving stations at or near the surface of the earth, and records are made of the returning waves. The times required for the waves to travel from the seismic wave source to the successive strata, and thence by reflection to the receiving stations, is determined from the records. These times are employed in the determination of the depth, the strike and the dip of the various reflecting strata. In correlation shooting, the similarity of waves in different records is employed to recognize reflections from different widely spaced apart portions of various strata.

In continuous profiling a large number of receiving stations are employed and they are so arranged relative to the generating stations that waves are reflected from subsurface strata from a series of relatively closely spaced points. The time of travel of waves from closely spaced points that are recorded on different records is very nearly the same. Such continuous profiling methods are described and claimed in Patent 2,329,721, issued to Herbert Hoover, Jr., et al. and Patent 2,259,478, issued to Charles Gill Morgan. As explained in those patents, continuous profiling is conducted by generating seismic waves at one or more stations, and receiving the seismic waves at a number of spreads of receiving stations, by changing either the generating station or the spread of receiving stations, or both, between successive recordings. In any event, in continuous profiling, seismic waves are reflected from successive continuous portions of the subsurface strata while the time relationship mentioned above is maintained. In continuous profiling, similarity of waves reflected from the closely spaced points is employed to recognize reflections from adjacent parts of various strata.

In correlation shooting, a small number of reception points are employed in the neighborhood of each of the generating stations and the portions of the subterranean strata from which the reflected waves are received are generally more or less isolated from each other, being spaced apart by gaps that are large compared with the lengths of the portions of the subterranean strata from which waves originating at a particular generating point are reflected to a particular spread of reception points. In contrast, in continuous profiling such gaps are either absent or are small compared with the length of the portions of the subterranean strata from which reflected waves are recorded. The resultant survey of the subterranean formations determined from the records of the waves received, either in the continuous profiling methods or in correlation shooting, is employed to determine where petroleum is most likely to be found in the area surveyed.

Usually in any area to be explored by methods of reflection seismic surveying, whether by correlation techniques or by continuous profiling techniques, a weathered layer overlies a series of strata. Such a weathered layer is generally characterized by a relatively low seismic wave velocity, in the range of about 500 feet per second to about 2000 feet per second. The weathered layer also varies in thickness from one point to another. Furthermore, the velocity with which seismic waves travel through the weathered layer, as in a vertical direction, often varies horizontally from point to point in the area under investigation. The layer, or stratum, directly beneath the weathered layer is often referred to as the subweathered layer. The subweathered layer is generally characterized by a seismic wave velocity that is much higher than that at the bottom of the weathered layer, often being about 5000 feet per second, and higher. On the average, the velocity of seismic waves increases with increase in depth below the weathered layer. The velocities that characterize various strata beneath the weathered layer are generally relatively constant over wide areas.

Due to variations in the thickness and seismic wave velocity of the weathered layer from point to point throughout an area under investigation, the time required for a seismic wave to travel from a seismic wave source downward to a reflecting stratum and from there upwardly to a seismic wave receiver, depends not only on the location of the reflecting stratum and the velocity of travel of seismic waves through the strata below the weathered layer, but also depends upon the thickness of the weathered layer beneath the shot point and beneath the seismic wave receiver and the velocity of travel of seismic waves through those parts of the weathered layer.

In order to make it possible to correctly compare travel times of waves received at different seismic wave receiving stations, so as to determine the relative depths and the dips of the portions of a reflecting stratum, from which seismic waves have been reflected, use is generally made of weathering correction techniques. Usually such techniques involve the generation of seismic waves at points near the respective seismic wave receivers and the detection of waves that travel to the seismic wave receivers from the shot points, by refraction paths along the bottom of the weathered layer. In many areas, however, such techniques cannot be practiced effectively, because the weathered layer in fact includes two relatively low velocity layers that are separated by a layer of relatively high velocity. Such a high velocity layer interferes with the return of energy by waves which may be refracted at the bottom of the weathered layer. In fact, if such a layer has a higher velocity than the subweathered layer, extremely little, if any, energy is returned by a refraction path that includes a portion that lies along the bottom of the weathered layer.

High velocity layers of the type mentioned which may interfere with the application of ordinary weathering correction techniques, include Caliche, hanging water tables, and the like. Such high velocity layers may vary in thickness throughout an area under investigation, at least over widely separated parts thereof, thus themselves not only interfering with the application of ordinary techniques but themselves adding to the difficulty of measuring the depth of the wethered layer and the time required for seismic waves to travel therethrough.

In all cases where the dips of the subterranean stratum are low, and where the closure of an anticline or other structure is small, it is very important that account be taken of variations in the characteristics in the weathered layer from point to point throughout the area under investigation. High accuracy in the making of such corrections is also required where the structure to be identified is of a type in which the recognition of the structure depends upon a horizontal variation of the velocity of travel of vertically traveling seismic waves in various deep strata. Such a condition occurs for example where a reef or a lens or other stratigraphic trap of horizontally variable lithology is located above a relatively flat reflecting stratum. In such a case an irregularity or anomaly in the time of travel of seismic waves to such a flat reflecting stratum appears in the neighborhood of the trap. For example, if a reef exists above such a flat stratum a virtual or apparent anticline appears in the flat stratum. Usually the apparent closure of such a virtual anticline is very low. Such anticlines may not be recognized at all if the time differences introduced by the travel of waves through various portions of the reef and neighboring formations are masked by time differences introduced by virtue of the travel of the waves through various parts of the weathered layer. Furthermore, virtual reefs may be assumed to be present, even when they are not, if proper account is not taken of the horizontally variable characteristics of the weathered layer.

In order to increase the accuracy of making weathering corrections, especially in areas where the weathered layer comprises two parts that are separated by a high velocity layer, a technique known as "vertical velocity profiling" is employed. In one application of such a method, a velocity hole is drilled through the weathered layer and, generally, into the subweathered layer. A plurality of geophones, or hydrophones, are then arranged along a vertical line in the velocity hole at predetermined depths therein. Seismic waves are then generated by a detonation of a small charge of explosive adjacent to the top of the velocity hole and measurements are made of the time required for the waves to travel from the point of detonation to the respective geophones.

The data so obtained may be plotted in the form of a time depth graph and the results may be employed to determine both the depth of the weathered layer at the velocity hole and also the average time required for waves to travel through the weathered layer at the velocity hole. Usually such velocity holes are located within or adjacent to each spread of receivers and the data obtained at each velocity hole are employed for correcting the travel time of reflected waves received at each spread to a common datum plane.

Considerable difficulty has been experienced in making such vertical velocity profiles, because, for some reason not fully understood, spurious electrical waves are produced in the conductors that connect the hydrophones to the recording equipment, and these spurious waves are of such an amplitude and character that they interfere with the detection of the first breaks, or inception of the trains of seismic waves that are received at the various geophones in the velocity hole.

The present invention relates to methods and means for reducing such spurious waves to such a low amplitude compared with the amplitudes of the first breaks that the times of occurrence of such first breaks may be accurately measured. The method and means for reducing the strengths of such spurious waves to such a point that they no longer substantially interfere with the measurement of such first breaks, will be best understood by reference to the following description taken in connection with the accompanying drawings, in which:

Fig. 3 is a schematic sectional view of a section of cable employing the invention;

Fig. 4 is a schematic view, in perspective, of a section of cable employing the invention, cut away to show successive layers more clearly;

Fig. 5 is a cross-sectional view of the cable of Fig. 4 taken as indicated by line 5—5;

Fig. 6 is a corresponding cross-sectional view of an alternative embodiment of the invention; and Fig. 7 is a cross-sectional view of a cable joint incorporating a geophone unit, taken as indicated by line 7—7 of Fig. 3.

Figure 1:
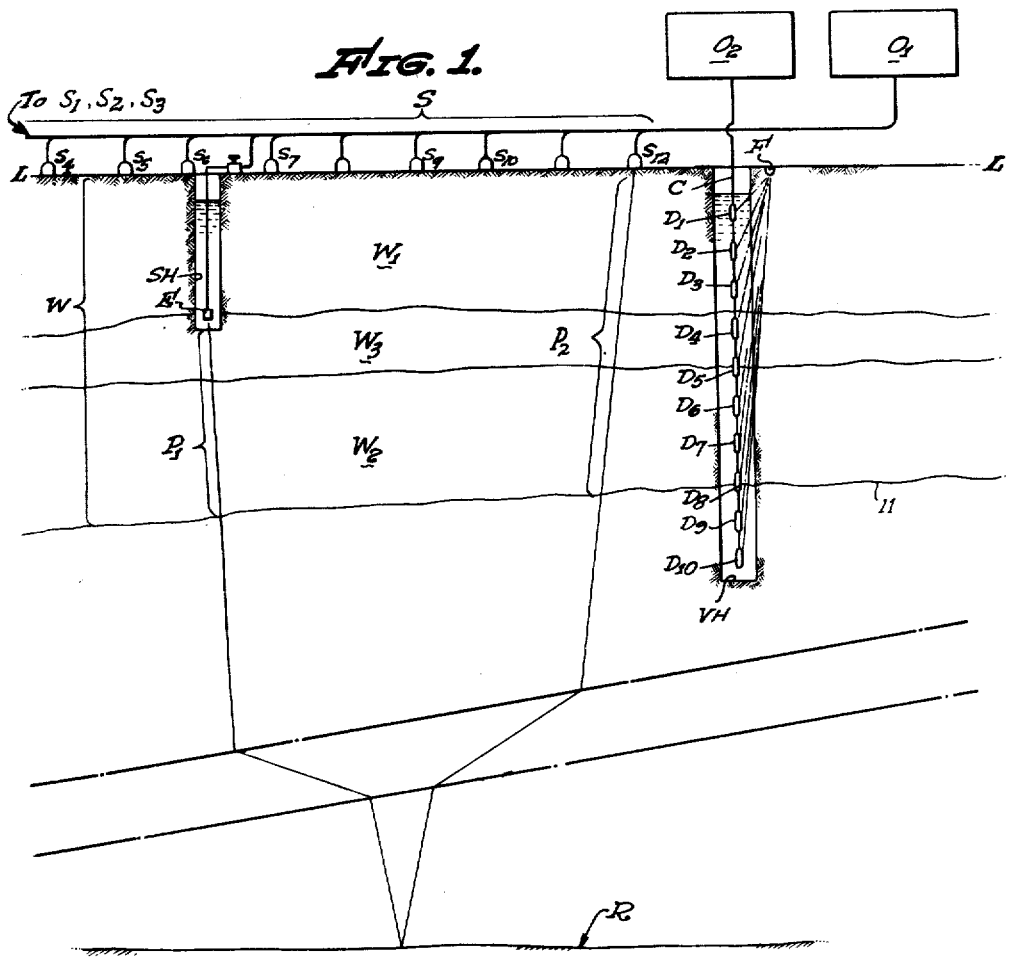
Figure 1 is a vertical cross-section of a section of the earth being explored with the aid of the invention.

To illustrate the use to which the invention is put, reference is made to Fig. 1, wherein there is shown a single spread S of seismometers $S_1$—$S_{12}$ arranged along the surface of the earth. A shot hole SH is arranged between the ends of the spread and a vertical velocity hole VH is located at one end of the spread. While a velocity hole may also be employed as a shot hole, the frequency of occurrence of velocity holes compared to the frequency of occurrence of ordinary shot holes depends largely upon the degree of variation of characteristics of near surface beds found to exist along the line of exploration L—L. The specific set-up of a shot hole SH and the seismometer spread S illustrated would ordinarily be only one setup of a large number of setups that are employed to perform continuous profiling along an extended line of exploration L—L.

In order to make a record of the type generally employed, seismic waves are generated by detonation of an explosive charge E, located at a predetermined depth below the surface of the earth in the shot hole SH. Seismic waves traveling outwardly therefrom travel downwardly to a reflecting bed R, and are then returned upwardly to the various seismometers $S_1$—$S_{12}$ of the spread. Each of the seismometers converts the received seismic waves into corresponding electrical waves which are recorded as separate traces on a strip of recording paper by means of a multiple-element recording device $O_1$ of conventional design. In such a record an indication is produced of the instant of detonation of the charge E and also the times of arrival of various seismic waves that are detected by the seismometers $S_1$—$S_{12}$. The times required for seismic waves to travel from the shot point or seismic wave generating station at which the explosive charge E is located, to the respective seismometers are then measured and these measurements are employed in ascertaining the nature and configuration of subterranean geological structures.

In the specific setup illustrated, it will be noted that the weathered layer W comprises two parts, $W_1$ and $W_2$, that are characterized by relatively low velocity of, say, 1500 feet per second, and an intervening layer $W_3$ of Caliche or other material characterized by a relatively high velocity of, say, 8000 feet per second.

In order to make accurate comparisons of the time of travel of seismic waves in various setups to a particular reflecting bed R, it is desirable to know with a high degree of accuracy the time required for seismic waves to travel in each setup through the parts $P_1$ and $P_2$ of the seismic wave travel path that lie within the weathered layer W. The first part $P_1$, it will be noted, is the part of the seismic wave travel path that lies between the seismic wave source where the charge E is located and the bottom of the weathered layer substantially directly thereneath, while the other part $P_2$ of the path represents the part of the weathered layer that lies substantially directly beneath the seismometer in question. It is to be noted that the weathered layer W may have a depth of only 400 feet to 500 feet, while the reflecting horizon R may lie at a much greater depth of about 5000 feet to 10,000 feet. Even if the reflecting horizon has a substantial dip and the waves are not traveling vertically, either directly beneath the charge E, or directly beneath the seismometer $S_{11}$, nevertheless, the general principles of the invention still apply without substantial modification.

In order to obtain a vertical velocity profile to make accurate weathering corrections in the neighborhood of the spread, a cable to which are connected a plurality of detectors $D_{12}$—$D_{10}$ is lowered into the velocity hole, preferably to a depth beneath the bottom 11 of the weathered layer. A small charge F of explosive is detonated at the surface adjacent the top of velocity hole VH. Records of seismic waves which travel downwardly along substantially vertical paths to the respective seismometers $D_1$—$D_{10}$ are made by means of a second oscillograph $O_2$, a record also being made of the instant of detonation of the charge in question. Except for errors that might be introduced because of the spurious waves that are often present, measurements of the times of travel of seismic waves from the surface charge F to the various seismometers may be employed to plot a time depth graph, as shown in Fig. 2.

Figure 2:
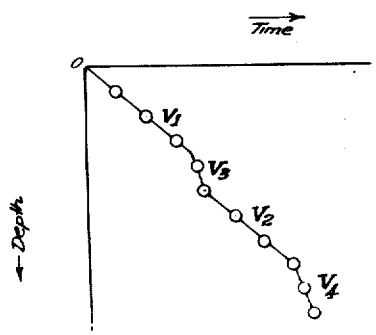
Fig. 2 is a graph showing strata depth as a function of seismic wave travel time.

It will be noted that the graph of Fig. 2 has four distinctly different portions. The slope of the upper portion $V_1$ indicates the existence of a relatively low velocity layer $W_1$ adjacent the surface. The slope of the next lower portion $V_3$ indicates the presence of a relatively high velocity layer $W_3$, such as a Caliche layer. The slope of the next lower portion $V_2$ indicates the presence of a second relatively low velocity layer $W_2$ of the weathered layer, the velocity in this portion of the weathered layer being approximately equal to that of the upper portion $V_1$. Abrupt changes between the sections $V_1$, $V_3$ and $V_2$ indicate the depths of the upper and lower surfaces of the high velocity layer $W_3$. Beneath the section $V_3$ of the time depth graph, a fourth part $V_4$ indicates the presence of a relatively high velocity sub-weathered layer. The intersection between the two parts $V_3$ and $V_4$ of the graph indicates the depth of the bottom of the weathered layer at the velocity hole VH.

The methods by which the data represented in the graph of Fig. 2 are employed together with the depth of the shot hole SH, the elevation of the seismometers $S_1$—$S_{12}$, and other data to obtain accurate determinations of the lengths of the parts $P_1$ and $P_2$ of a seismic wave travel path and also accurate determination of subsurface structure are well known in the art and need not be described in detail here. The data of Fig. 2 are also useful in determining the best depth at which to detonate the charge E in the shothole SH.

The present invention deals particularly with improvements in the cable C, that are employed to produce more accurate and more reliable time depth graphs of the type illustrated in Fig. 2. The nature of the improvement constituting the present invention may be understood by reference to Fig. 3 to Fig. 7, where the invention is applied to a cable that utilizes a plurality of barium-titanate crystal geophone units.

As indicated in Figs. 4 and 5, the cable C is formed about a central strength member 14 that comprises a plurality of strands 15 of high tensile strength, flexible steel wire that are twisted together and which are enclosed within a vinyl jacket 16 that is formed thereover by an extrusion process. The insulated central strength member 14 is coated with graphite as by drawing it through a box full of finely divided graphite material. While this graphite coating may sometimes be omitted, superior results are obtained by including it. Immediately about the coated vinyl jacket 16 are disposed a plurality of twisted pairs 17, each comprising a first insulated conductor 19 and a second insulated conductor 20, that are twisted together to minimize inductive effects of stray external fields. The insulating layers 18 that surround the conductors are also preferably vinyl. The external surfaces of the insulated conductors 19 and 20 are coated by drawing the twisted pairs through a box full of finely divided graphite material, though the insulated conductors may be coated individually and then twisted together. In any event, the coated twisted pairs are then tested electrically to determine whether there is any leakage between the internal and external surfaces of the insulation 18 surrounding the conductors. After testing and selecting a suitable number of pairs of coated twisted conductors, they are then applied in an annular array about the strength member 14. A pair of strips of paper 21 of the parchment type are impregnated or coated with oil and then the oiled paper is coated by applying graphite to both sides, the oil serving to assist in retaining the graphite on the paper. These strips of paper are arranged longitudinally along the length of the assembled group of twisted pairs, and a copper sheath 22 is then braided therearound. The outer surface of the copper sheath 22 is then coated with graphite, such as by drawing the braid covered assembly through a box full of finely divided graphite. After the braided sheath 22 has been coated externally with graphite, the braid covered assembly is then covered with a wear-resistant protective sheath 24 by applying vinyl thereto by an extrusion process.

In another embodiment of the invention, as illustrated in Fig. 6, the interstices between the insulated conductors are filled with powdered graphite. In still another embodiment of the invention, the graphite is applied in the form of a paint rather than in the form of powder. In any event, it will be noted that all of the external surfaces of the insulated conductors are coated with a layer of relatively high resistance semi-conductive material, and that in the best embodiment of the invention described, the outer surface of the central strength member is also coated with such semi-conductive material. Likewise, it will be noted that all of the unexposed surfaces of the protective and shielding layers formed by the paper 21, the braided shield 22 and sheath 24, are likewise coated with semi-conductive material. All of the graphite coatings are electrically connected together and to a common ground, thus shielding all of the conductors from each other electrostatically and from the wires 15 of the strength member and from the braided sheath 22.

The vinyl referred to herein is a thermoplastic resinous material of the class including polyethylene vinyl chloride.

The next step in the preparation of the cable is that concerned with the installation of the geophone units themselves. As seen in Fig. 3, at each point where a geophone is to be connected to the cable, a slit is cut through the outer sheath 24, the braided cover 22, and the paper coating 21. A conducting pair 17 is selected and cut, and the free ends 25 and 26 are pulled out of the cable assembly. The cable is then sealed to close the slit at the point of take-off of the free ends 25 and 26, and the free ends are cleaned of graphite and scraped bare for connection to the crystal unit, which consists of two semicylindrical elements 27 and 28 of piezo-electric material. The sealing may be effected by locally heating the thermoplastic coating 24 and the thermoplastic insulation of members 18 at the point of take-out, and permitting the heated portions to coalesce to form a unitary structure. All graphite is removed from the free ends 25 and 26 by washing, brushing, and wiping to prevent grounding of the conductor wires.

Any of the well known types of piezo-electric material may be used, but the barium titanate crystals are preferred because of their high sensitivity to pressure variations and the fact that they may be rendered sensitive in a radial direction. These crystals are supplied commercially by a number of manufacturers with a surface plating of conductive material, such as silver, to which leads may be attached by soldering. The bare terminals of the free ends 25 and 26 are soldered, one to the inner surfaces and the other to the outer surfaces of the crystals 27 and 28. Jumper 41 may be employed to connect the inner surfaces of the two crystals 27 and 28 together electrically, and jumper 42 may likewise be employed to connect the outer surfaces of the two crystals together electrically. The semicylindrical crystals 27 and 28 have preferably been prepared prior to placing on the cable by subjecting them to an intense electrostatic field in a radial direction at a time when the crystal has been heated above the Curie point. As is well known in the art, when heated above the Curie point, the previous pattern of crystallization is lost, and if the crystals are then allowed to cool through the Curie point in the presence of a string electric field, recrystallization takes place, with the crystals oriented in the direction of the field. Hence, by heating above the Curie point in the presence of a strong electric field, a strong radial field, the previous random orientation is changed to a radial polarization, so that thereafter the crystal units are more sensitively responsive to pressure waves applied to them in a radial direction.

These radially sensitive crystal units are then applied to the cable as described, soldered to the free ends 25 and 26 of a selected pair, and held in place by a suitable casing, which may be, for example, an injection molded vinyl casing 30 applied thereover, and terminal casing members 31 and 32 similarly molded on the cable adjacent the point at which connection to the free pair ends 25 and 26 was made, so that a smooth cylindrically surfaced unit is provided of such a shape as not to interfere with the insertion of the cable in, or removal of the cable from, a velocity hole. As a practical matter, the diameter of the geophone units need be little more than twice the diameter of the cable C itself. The geophone units as a whole are indicated generally as 34. In a typical cable designed for commercial use the maximum outside diameter of the pickup unit at the largest portion is only about 1½ inches.

When a cable of this invention is employed for making a vertical velocity profile as in the method described hereinabove in connection with Fig. 1, it is found that spurious signals that would otherwise appear are greatly attenuated, thus making is possible to recognize first breaks more easily and to measure the times of arrival of the first breaks at the various seismometers $D_1$—$D_{10}$ more accurately. Cables that have been coated in the manner described above are particularly suitable for use with geophones of the piezo-electric type, which have a relatively high electrical impedance of over 10,000 to over 100,000 ohms at a frequency of, say, 50 cycles per second in the middle of the band of frequencies of seismic waves to be recorded.

While the effectiveness of the cable could be increased by applying coatings of high resistance conductive material, such as graphite, to the internal surfaces of the insulation that surrounds the conductors, and also to the internal surface of the jacket of the central strength member, this would greatly increase the cost of manufacture and in practice is found to be an unnecessary refinement.

By employing cables embodying this invention, greater accuracy in the making of weathering corrections is obtainable, thus making it possible to survey more accurately formations that may be oil-bearing, but in which the vertical closure is small, such as about only 25 to 50 feet.

The use of such coatings and the twisting of the conductors cooperate with the braided sheath to shield the conductors from electrostatic pickup from high voltage lines and the like in the area under investigation. The twisting of the conductors also reduces electromagnetic induction of signals from such high voltage lines. At the same time the coatings prevent any fluctuations in interconductor capacitances that might occur because of the compression and expansion or other action of seismic waves on the cable. Thus, both spurious signals produced by electromagnetic or electrostatic induction and spurious signals produced by the action of seismic waves on the cable itself are reduced below the point where they interfere with measurements of first breaks.

While the invention has been described in detail with respect to a cable having a central strength member 14, it will be understood that it also applies to cables in which the individual conductors themselves act as strength members. In the latter case, the conductors have been made of various high tensile strength materials such as copper clad steel or phosphor bronze. The invention is applied to cables of this type in the same manner as it is applied to cables of the type having central strength members, except that the step of coating such a central strength member with graphite is, of course, omitted. In any event, each of a plurality of insulated twisted pairs is coated with a semiconductive material so that the conductors are shielded from one another.

Moreover, the advantages of the invention may be obtained in part by constructing the cable as hereinbefore described and omitting the woven metallic shield 22. However, it is found in practice that even further reduction of spurious signals arising from either physical or electrical disturbances of the cable is effected by inclusion of the shield.

While the invention has been described only with reference to its application to vertical velocity profiling, it will be understood that it may also be applied to other systems, in which a vertical array of seismometers is employed to detect reflected seismic waves. More particularly, the invention is applicable to systems in which reflected waves are received at such vertical arrays of seismometers, such as the systems described in copending patent applications Serial No. 319,969 and Serial No. 353,326, filed by Raymond A. Peterson. In such a case the cables used for receiving the reflected waves may also be employed in making a vertical velocity profile. It is therefore to be understood that the invention is not limited to the particular application thereof that is described herein. Furthermore, it will be understood that many changes which will now appear to those skilled in the art may be made in the details of construction, the forms of the parts, and the materials employed, without departing from the invention as defined by the appended claims.

The invention claimed is:

1. The combination, in a device for use in seismic surveying, of a cable, and a plurality of piezo-electric detecting units spaced at intervals therealong, wherein said cable is of circular external cross-section and comprises a plurality of twisted pairs of insulated conductors, a plurality of insulating and shielding layers disposed about all of said twisted pairs, and means covering the external surface of each of said insulated conductors for providing an electrical leakage path between all points on said external surface, each of said detecting units comprising an annular piezo-electric crystal member surrounding said cable and having its crystalline structure oriented radially with respect to the longitudinal axis of said cable, and having inner and outer conducting surfaces separately connected to the individual respective conductors of a different one of said twisted pairs.

2. The combination, in a device for use in seismic surveying, of a cable having a circular external cross-section, and a plurality of piezo-electric detecting units spaced at intervals therealong, wherein said cable comprises a centrally positioned strength member, a plurality of twisted pairs of insulated conductors surrounding said member, each conductor having an insulation sheath an insulating layer surrounding all of said twisted pairs and said strength member, means covering the external surface of each of said insulation sheaths for providing an electrical leakage path between all points on said sheaths, and a conductive coating covering said insulating layer for providing a leakage path throughout the length of said layer, each of said detecting units comprising an annular piezoelectric crystal member encircling said cable and having its crystalline structure oriented radially with respect to the longitudinal axis of said cable and having inner and outer conducting surfaces separately connected to the individual respective conductors of a different one of said twisted pairs.

3. A pressure-responsive transducer for vertical velocity profiling in seismic surveying, comprising a cable member and a plurality of crystal detector units in spaced relationship thereon, wherein said cable comprises a flexible central strength member adapted to support elements associated therewith, an insulating coating disposed about said strength member, a plurality of twisted pairs of insulated conductors disposed in annular array about said central strength member, an insulating sleeve surrounding each conductor, a layer of semi-conducting material disposed continuously over the outer surfaces of each sleeve, a layer of impregnated fibrous material coated with a continuous layer of semi-conducting material on both sides thereof, said layer of fibrous material surrounding said array, a flexible braided metallic shield having a continuous layer of semi-conducting material, said shield being disposed about said layer of fibrous material, and a protective insulation jacket extruded about said braided metallic shield, said plurality of crystal detector units being disposed at intervals along said cable, each of said detector units being connected to a different pair of said twisted conductors.

4. The combination, in a device for use in geophysical prospecting, of a cable and a plurality of crystal detecting units spaced therealong, wherein said cable is of circular external cross-section and comprises a central strength member, a plurality of twisted pairs of insulated conducting members disposed about said member, a plurality of insulating and shielding layers disposed about said twisted pairs, and means for providing a high resistance leakage path between all points of the external surfaces of each of said insulating and shielding layers within said cable, each of said crystal detector units comprising an annular crystal of piezo-electric material having its crystalline structure radially oriented with respect to the longitudinal axis of said cable, said crystal being connected on its inner surface to one conductor of one of said twisted pairs and on its outer surface to the other conductor of the same twisted pair.

5. The combination of a cable and a plurality of geophones for use in geophysical prospecting, comprising a cable of circular external cross-section and having a central strength member formed of a plurality of flexible steel wires twisted together, a jacket of thermoplastic material extruded about said strength member and in intimate contact therewith, an outer jacket of insulating wear-resistant thermoplastic material disposed concentrically about and spaced from said strength member, a flexible jacket of braided metallic material disposed within and adjacent to the inner surface of said outer jacket, said material being coated on both sides with a semiconducting material, a parchment-type paper layer treated with a semi-conductive material on both sides thereof and disposed adjacent to the inner surface of said flexible jacket and defining with said central strength member an annular space therewithin, a plurality of twisted pairs of insulated conductors disposed within said annular space, a coating of semi-conductive material disposed continuously along the outer surface of each of said twisted pairs of insulated conductors, and a plurality of geophones disposed at spaced intervals along said cable, each of said geophones comprising a pair of semi-cylindrical crystals of piezo-electric material disposed about said cable and connected to one of said twisted pairs of conductors, and means for hermetically sealing each of said crystal pairs along said intervals, said last means being responsive to an external pressure exerted upon said means for transmitting said pressure to said crystal pairs.

6. The combination of a cable and a plurality of spaced crystal detectors for use in geophysical prospecting comprising a cable that is of circular external cross-section, said cable including a central strength member, a plurality of twisted pairs of insulated conductors disposed in annular array thereabout, each conductor having an insulation layer, a paper layer surrounding said array of twisted pairs, a braided layer of highly conductive material surrounding said paper layer, and an insulating jacket enclosing said braided layer, said insulation, paper and braided layers having their respective external surface coated with a continuous layer of relatively high electrical resistance material, each of said crystal detectors comprising a pair of semi-cylindrical piezo-electric units disposed with their cylindrical axes parallel to the axis of said cable, and having plating on their inner peripheries connected to one conductor of one of said twisted pairs, and having plating on the outer surface thereof connected to the other conductor of said one of said twisted pairs, said crystal detectors being polarized in a radial direction with respect to said axis.

7. A pressure-responsive transducer for use in geophysical prospecting, which comprises a supporting and connecting cable of circular cross-section and a plurality of uniformly spaced geophones attached thereto, each of said geophones comprising a cylindrical crystal member extending about and coaxial with said cable, said cylindrical member having its crystal structure oriented radially with respect to the longitudinal axis of said cable and having a conducting inner surface coating connected to one member of a twisted pair, and a conducting outer surface coating connected to the other member of said twisted pair, said cable having an outer jacket of extruded plastic material of the thermo-plastic vinyl type, a flexible braided copper sheath disposed immediately within said vinyl jacket, a paper layer disposed immediately within said flexible braided copper sheath, an electrically conductive layer of high resistance material disposed continuously over the surfaces of said braided sheath and said paper layer to provide a high resistance leakage path throughout the length of cable, a plurality of twisted pairs of conductors disposed annularly within said paper layer, one of said twisted pairs being connected to each of said crystal members, and each of said twisted pairs being coated continuously on its external surface with a layer of high resistance material, a strength member centrally disposed within said cable and adapted for the support thereof, said strength member having a flexible steel core, and means for hermetically sealing each of said geophones to and along the outer surface of said cable.

8. A cable structure for use in vertical profiling in connection with geophysical prospecting, comprising a central strength member formed of a plurality of flexible strand members of high tensile strength twisted together, a plastic jacket extruded over said central strength member, a plurality of conductors associated in pairs and disposed in annular array about said central member, each of said conductors having an insulating covering and each associated pair of insulated conductors being twisted together along its length and having a continuous coating of semi-conducting material over the external surface thereof, a layer of oil impregnated paper having its surface coated on all sides with a continuous coating of a semi-conductor material, said paper enclosing said annular array of conductors, a flexible conducting metallic shield disposed about the outer surface of said paper layer and having both its interior and exterior surfaces continuously coated with a continuous coating of a semi-conductor material, and a flexible, wear-resistant insulating jacket formed about said flexible shield, said conductors being adapted to provide connections from desired points along the length of said cable to exterior circuits, and said jacket being sealed about such connections to said circuits.

9. In a cable for use in seismic surveying, the combination which comprises a central strength member adapted to support said cable in a bore hole, said strength member comprising a plurality of twisted resilient strands of conducting material enclosed in a plastic jacket of thermo-plastic insulating material, a plurality of twisted pairs of insulated conductors disposed in annular array about said strength member, a continuous layer of semi-conductive paint applied over the surface of each of said insulated twisted pairs, an oil-impregnated paper layer surrounding said array of said twisted pairs and having both inner and outer surfaces covered with a continuous layer of semi-conductive paint, a braided metallic flexible shield disposed about said paper layer and having continuous inside and outside coatings of said semi-conductive paint, and a flexible insulating wear-resistant plastic jacket surrounding said braided shield and adapted to seal the interior of said cable.

10. In a cable for use in geophysical prospecting, the combination of a central strength member, a plurality of twisted pairs of insulated conductors disposed annularly around said strength member and insulated therefrom, a layer of fibrous material surrounding said annular array and coated on both sides with a semi-conducting material, a flexible metallic shield disposed thereabout and coated on both sides with a layer of semi-conductive material, and a flexible sheath of insulating material disposed about said braided shield, wherein substantially all of the interstitial space between said elements in said cable assembly is filled with finely divided semi-conducting material of the class of powdered graphite.

References Cited in the file of this patent
UNITED STATES PATENTS

| 2,217,284 | Lunt | Oct. 8, 1940 |
| 2,440,903 | Massa | May 4, 1948 |
| 2,581,994 | Winterhalter | Jan. 8, 1952 |
| 2,622,691 | Ording | Dec. 23, 1952 |

OTHER REFERENCES

Publication, T. A. Perls: "Electrical Noise from Instrument Cables Subjected to Shock and Vibration," Journal of Applied Physics, vol. 23, No. 6, June 1952, pp. 674–80.

UNITED STATES PATENT OFFICE
CERTIFICATE OF CORRECTION

Patent No. 2,788,513                                                                  April 9, 195'

Edgar T. Howes

It is hereby certified that error appears in the printed specification of the above numbered patent requiring correction and that the said Letters Patent should read as corrected below.

Column 3, line 7, for "wethered" read -- weathered --; column 5, line 14, for "$D_{12}-D_{10}$" read -- $D_1-D_{10}$ --; column 7, line 18, for "string" read -- strong --; line 21, for "in the presence of a strong electric field," read -- , and allowing tk crystals to cool under --; column 9, line 66, after "disposed" insert -- within --.

Signed and sealed this 11th day of April 1961.

(SEAL)
Attest:

ERNEST W. SWIDER
Attesting Officer

ARTHUR W. CROCKER
                                               Acting Commissioner of Patents